United States Patent
Brunner et al.

(10) Patent No.: US 12,363,146 B2
(45) Date of Patent: *Jul. 15, 2025

(54) METHOD AND SYSTEM FOR PREDICTING CYBER THREATS USING DEEP ARTIFICIAL INTELLIGENCE (AI)-DRIVEN ANALYTICS

(71) Applicant: AT&T Intellectual Property II, L.P., Atlanta, GA (US)

(72) Inventors: James Brunner, Holmdel, NJ (US); Laurie Kraus, Old Bridge, NJ (US); Christopher Iverson, Hoboken, NJ (US); James Cignarella, Millstone Township, NJ (US); Krissa Van Hoorebeke, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,579

(22) Filed: Jun. 19, 2024

(65) Prior Publication Data

US 2024/0340296 A1 Oct. 10, 2024

Related U.S. Application Data

(63) Continuation of application No. 17/535,845, filed on Nov. 26, 2021, now Pat. No. 12,058,151.

(51) Int. Cl.
*H04L 9/40* (2022.01)
*G06N 7/01* (2023.01)
(Continued)

(52) U.S. Cl.
CPC ......... *H04L 63/1416* (2013.01); *G06N 20/20* (2019.01); *H04L 43/028* (2013.01)

(58) Field of Classification Search
CPC ............ H04L 63/1416; H04L 63/1408; H04L 63/1425; H04L 63/1433; H04L 63/1441;
(Continued)

(56) References Cited

U.S. PATENT DOCUMENTS

| 11,037,173 B1 | 6/2021 | Gurnov et al. |
| 11,227,047 B1 | 1/2022 | Vashisht et al. |

(Continued)

FOREIGN PATENT DOCUMENTS

CN 110299008 A * 10/2019

OTHER PUBLICATIONS

AI Cybersecurity Startups Using Predictive Analytics, https://www.nanalyze.com/2017/07/4-ai-cybersecurity-predictive-analytics; pp. 1-7, downloaded Sep. 14, 2021.

(Continued)

*Primary Examiner* — Alina A Boutah
(74) *Attorney, Agent, or Firm* — Guntin & Gust, PLC; Kenneth S. Kwan

(57) ABSTRACT

Aspects of the subject disclosure may include, for example, obtaining data that identifies network traffic associated with a threat actor, responsive to the obtaining the data, performing feature extraction on the data, resulting in extracted features, classifying the network traffic based on the extracted features, detecting, in accordance with the classifying the network traffic, an action change in the network traffic, resulting in a detected action change, predicting a future traffic profile for the threat actor based on the detected action change, and responsive to the predicting the future traffic profile, generating an alert regarding the future traffic profile, thereby enabling mitigation of a security risk associated with the threat actor. Other embodiments are disclosed.

20 Claims, 12 Drawing Sheets

(51) Int. Cl.
*G06N 20/00* (2019.01)
*G06N 20/20* (2019.01)
*H04L 43/028* (2022.01)

(58) Field of Classification Search
CPC . H04L 63/1458; H04L 43/028; H04L 43/026; H04L 41/147; G06N 20/20; G06N 20/10; G06N 20/00; G06N 3/006; G06N 3/044; G06N 3/045; G06N 3/08; G06N 3/088; G06N 5/01; G06N 7/01
See application file for complete search history.

(56) References Cited

U.S. PATENT DOCUMENTS

| | | | | |
|---|---|---|---|---|
| 11,574,243 | B1* | 2/2023 | Mallya Kasaragod | G06F 9/5044 |
| 11,888,703 | B1* | 1/2024 | Huberman | H04L 43/0847 |
| 2010/0034102 | A1 | 2/2010 | Wang et al. | |
| 2012/0096558 | A1* | 4/2012 | Evrard | H04L 63/1416 726/25 |
| 2015/0096024 | A1* | 4/2015 | Haq | H04L 63/1416 726/23 |
| 2015/0236935 | A1* | 8/2015 | Bassett | H04L 63/1408 709/224 |
| 2015/0333969 | A1 | 11/2015 | Vasseur et al. | |
| 2016/0028758 | A1* | 1/2016 | Ellis | H04L 63/1441 726/25 |
| 2017/0111233 | A1 | 4/2017 | Kokkula et al. | |
| 2017/0279833 | A1 | 9/2017 | Vasseur et al. | |
| 2017/0279839 | A1* | 9/2017 | Vasseur | H04L 63/1425 |
| 2019/0230116 | A1 | 7/2019 | Compton | |
| 2019/0258953 | A1 | 8/2019 | Lang et al. | |
| 2019/0297108 | A1 | 9/2019 | Johnston et al. | |
| 2020/0092176 | A1* | 3/2020 | Huberman | H04L 41/142 |
| 2021/0073377 | A1 | 3/2021 | Coull et al. | |
| 2022/0020027 | A1 | 1/2022 | Liu et al. | |
| 2022/0138568 | A1* | 5/2022 | Smolyanskiy | G06N 3/044 706/21 |
| 2022/0166795 | A1 | 5/2022 | Simioni et al. | |
| 2022/0231939 | A1 | 7/2022 | Mermoud et al. | |
| 2022/0263856 | A1* | 8/2022 | King-Wilson | G06Q 40/08 |
| 2023/0145097 | A1 | 5/2023 | Kiran et al. | |
| 2023/0171266 | A1 | 6/2023 | Brunner et al. | |

OTHER PUBLICATIONS

Artificial Intelligence and Cybersecurity: Opportunities and Challenges https://www.nitrd.gov/pubs/AI-CS-Tech-Summary-2020.pdf; Mar. 2020; pp. 1-15.

Hochreiter, S., Long Short-Term Memory. http://www.bioinf.jku.at/publications/older/2604.pdf; neural Computation 9(8): 1735-1780, 1997.

Kaelbling, L.P., et al., Planning and acting in partially observable stochastic domains. http://people.csail.mit.edu/lpk/papers/aij98-pomdp.pdf; Jan. 17, 1998, pp. 1-36.

Mnih, V., et al., Human-level control through deep reinforcement learning. Nature; https://storage.googleapis.cm/deepmind-media/dqn/DQNNaturePaper.pdf; doi Feb. 26, 2015, vol. 518, pp. 1-13.

Sutton, R., "Policy Gradient Methods for Reinforcement Learning with Function Approximation"; https://papers.nips.cc/paper/1999/file/464d828b85b0bed98e80ade0a5c43b0f-Paper.pdf; pp. 1057-1063; Nov. 29, 1999.

Sutton, R., et al., Between MDPs and semi-MDP: A framework for temporal abstraction in reinforcement learning. http://www-anw.cs.umass.edu/~barto/courses/cs687/Sutton-Precup-Singh-AIJ99.pdf; Dec. 1, 1998; pp. 1-31.

Veeramachaneni, K., et al., ""AI2: Training a Big Data Machine to Defend," IEEE 2nd International Conference on Big Data Security on Cloud (BigDataSecurity),", IEEE International Conference on High Performance and Smart Computing (HPSC), and IEEE International Conference on Intelligent Data and Security (IDS), New York, NY, 2016, pp. 49-54.

* cited by examiner

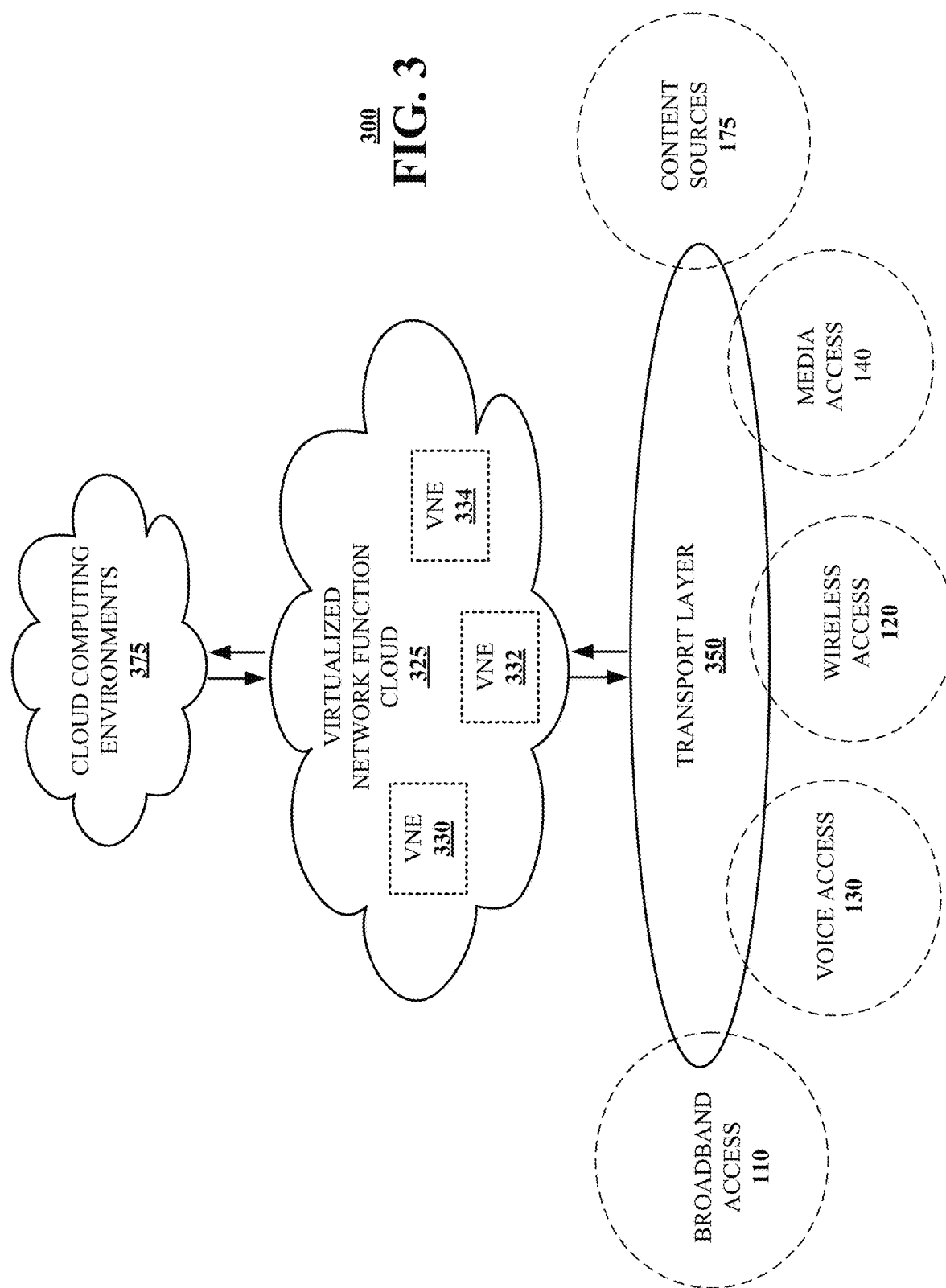

METHOD AND SYSTEM FOR PREDICTING CYBER THREATS USING DEEP ARTIFICIAL INTELLIGENCE (AI)-DRIVEN ANALYTICS

CROSS-REFERENCE TO RELATED APPLICATION

This application is a continuation of U.S. patent application Ser. No. 17/535,845, filed Nov. 26, 2021. The contents of the foregoing are hereby incorporated by reference into this application as if set forth herein in full.

FIELD OF THE DISCLOSURE

The subject disclosure relates to predicting and mitigating cyber threats based on deep AI-driven analytics.

BACKGROUND

As businesses and governments strive to be globally connected and to keep current with ever-advancing technologies, minimizing their exposure to the wide range of cyber risks is becoming increasingly important. Present cybersecurity solutions/algorithms are generally reactive—i.e., they are either designed to identify attacks, such as distributed denial-of-service (DDOS) attacks, after the attacks have already occurred, or detect for potential precursors to an attack more simplistically such as via scanning.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
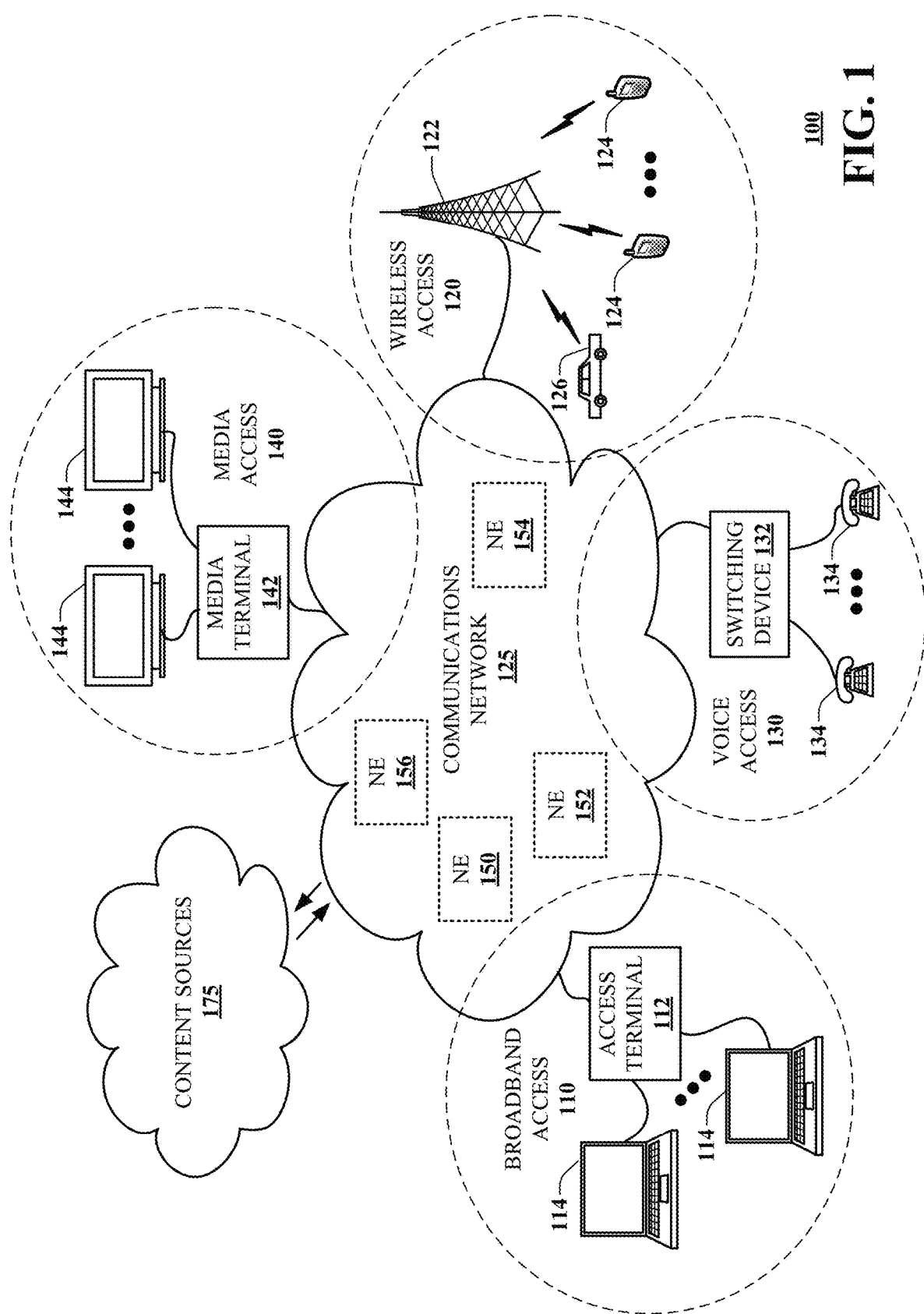
FIG. 1 is a block diagram illustrating an exemplary, non-limiting embodiment of a communications network in accordance with various aspects described herein.

Existing cybersecurity solutions generally employ analytic algorithms that are based on time-series, volumetric data. By establishing a baseline of normal traffic volumes and associated variations therefrom, the analytic algorithms produce a range of traffic volumes that are considered to be "normal" in the future. However, such solutions are merely reactive, since they seek to identify trends rather than specific cyberattacks, and thus are always one step behind attackers who have already achieved some level of success. Another prevalent form of cybersecurity analysis is signature based, which looks for matches in network traffic to known threat indicators, such as Internet protocol (IP) addresses previously identified to be in use by threat actors. Further, most threat actors originate their attacks from multiple IP addresses. For analysts, it is critical to mitigate threats from all known IP addresses that a threat actor may have control over. Identifying repeated malware signatures or command and control chokepoints can indicate whether multiple IP addresses are being utilized at the behest of a particular threat actor. Prior approaches utilize known signatures, involving IP addresses, domains, malware file names, hashes, and reverse engineering, to address threats, and cultivation of such signature-based threat intelligence requires a high degree of expertise, time, and effort as well as a priori detection or forensics. Advanced threat actors employ multiple techniques, such as polymorphic malware, encrypted malware, and rotating of command and control nodes, to avoid this type of detection.

The subject disclosure describes, among other things, illustrative embodiments of a (e.g., multi-agent) threat prediction platform that is capable of enabling proactive, behavior-based threat detection, analysis, prediction, and/or mitigation. In exemplary embodiments, the threat prediction platform may be configured to obtain data—e.g., broad scope NetFlow Internet metadata records or the like—that is descriptive of network traffic associated with one or more suspected threat actors or adversaries. In various embodiments, the threat prediction platform may be configured to classify network traffic into different categories (such that, for example, records generated by the same/similar network activity are assigned the same label) and detect for changes to combination(s) of observed types of traffic that may be effected at the behest of threat actor(s).

In exemplary embodiments, the threat prediction platform may be capable of identifying historical behavioral patterns (e.g., cycles or repetition of certain network activities, etc.) of threat actor(s), and predicting future threats using threat actor model(s) and/or representation(s) of current activities of the threat actor(s). In one or more embodiments, the threat prediction platform may employ reinforcement learning (RL) algorithm(s) (e.g., alone or in conjunction with one or more other machine learning (ML) algorithms) to model the decision-making processes of (e.g., human) threat actor(s) based on observations of those threat actor(s) as they move through their attack sequence upon success at each step. In various embodiments, the algorithm(s) may generate high-confidence prediction(s) (e.g., within a threshold level of confidence) of next steps in a cyberattack—including, for example, network protocols likely to be targeted by a threat actor, the type of traffic that the threat actor is likely to utilize, the level of threat for that traffic type, and/or the like—by identifying inflection points in the threat actor's campaign as indications that a change in phase or tactic has occurred, and by identifying/summarizing one or more distinct phases (e.g., each distinct phase) such that cycles and patterns in threat behaviors can be determined. Armed with this intelligence, network operators, for example, may proactively thwart or mitigate the impact of cyberattacks on enterprise assets and applications.

As important as cybersecurity is to industry, there is a notable lack of highly-skilled professionals who can effectively identify and mitigate threats. As large data sets regarding threat actor activities may be analyzed in real-time or near real-time, for example, predictive cybersecurity analytics (e.g., based on AI, such as ML and/or deep learning), as provided by various embodiments described herein, improve over existing reactive, signature-based approaches, and enable focused security operations in which limited cyber analyst resources may be directed to the most severe threats. This reduces or eliminates false positive alarms and increases the efficacy of network threat mitigations. Providing a predictive function of forecasting future actions of one or more (e.g., each of one or more) modelled cyber adversaries enables the scarce resources of skilled cyber analysts to be utilized more efficiently and effectively. Prediction of future actions of threat actors targeting a customer network, for instance, allows for defensive measures to be taken to prevent intrusion and compromise of customer assets, which offers huge cost savings in cyber analyst staff time in attack recovery and remediation.

Implementing exemplary embodiments in a cybersecurity service, such as those provided by a network operator, also enables proactive alerting for customer network and enterprise security purposes. For instance, embodiments of the threat prediction platform can prescribe potential defensive measures before an attack occurs, thereby preventing damage to network availability (e.g., from DDOS attacks), financial loss (e.g., from ransomware attacks), and negative company/agency perception by the public (e.g., due to data leakage).

Aspects of the threat prediction platform can be incorporated into a network's cybersecurity applications/services that may be used to protect network/enterprise platforms and assets. Such applications/services may include, for example, cybersecurity service(s) that analyze flow and domain name service (DNS) metadata to identify potential cyber threats and attacks based on customer Internet traffic traversing the operator's network; cybersecurity service(s) that collect and analyze security data from a variety of sources (e.g., the network, cloud(s), endpoint(s), software asset discovery, monitoring, and analysis system(s), etc.), detect intrusions, correlate events, and alert and report on potential security vulnerabilities and attacks; crowd-sourced computer security service(s) that manage a large database of threat indicators; cybersecurity service(s) that provide enterprise customers with monitoring, alerting, and mitigation of DDOS attacks via detailed network traffic analyses; and/or the like.

Exemplary embodiments of the threat prediction platform can also be employed to provide predictive cyber-analysis and defense for customer bases of vendors (e.g., cloud service providers or the like), which opens the door for partnerships or collaboration. Exemplary embodiments described herein can also be implemented as part of a customer trial or in consulting services, where report(s) on threat activity prediction accuracies can used as effective sales tools for a network operator's cybersecurity products and services.

One or more aspects of the subject disclosure include a device, comprising a processing system including a processor, and a memory that stores executable instructions that, when executed by the processing system, facilitate performance of operations. The operations can include obtaining data that identifies network traffic associated with a threat actor. Further, the operations can include, responsive to the obtaining the data, performing feature extraction on the data, resulting in extracted features. Further, the operations can include classifying the network traffic based on the extracted features. Further, the operations can include detecting, in accordance with the classifying the network traffic, an action change in the network traffic, resulting in a detected action change. Further, the operations can include predicting a future traffic profile for the threat actor based on the detected action change. Further, the operations can include, responsive to the predicting the future traffic profile, generating an alert regarding the future traffic profile, thereby enabling mitigation of a security risk associated with the threat actor.

One or more aspects of the subject disclosure include a non-transitory machine-readable medium, comprising executable instructions that, when executed by a processing system including a processor, facilitate performance of operations. The operations can include analyzing flow data associated with a suspected attacker operating over a network. Further, the operations can include, based on the analyzing the flow data, performing, using density-based clustering, classification of network traffic identified in the flow data. Further, the operations can include identifying an action change in the network traffic based on the classification. Further, the operations can include determining expected future activities of the suspected attacker using an ensemble of reinforcement learning (RL) algorithms. Further, the operations can include, responsive to the determining, causing a defensive measure to be effected in the network to thwart the expected future activities.

One or more aspects of the subject disclosure include a method. The method can comprise receiving, by a processing system including a processor, data that identifies network traffic associated with a plurality of suspected threat actors. Further, the method can include classifying, by the processing system, the network traffic based on extracted features. Further, the method can include detecting, by the processing system and based on the classifying the network traffic, action changes in the network traffic, resulting in detected action changes. Further, the method can include, based on the detected action changes, predicting, by the processing system, a respective future traffic profile for each suspected threat actor of the plurality of suspected threat actors, resulting in multiple future traffic profiles. Further, the method can include generating, by the processing system, recommendations that include suggested defensive actions to preempt activities corresponding to the multiple future traffic profiles. Further, the method can include outputting, by the processing system, the recommendations to enable mitigation of security risks associated with the plurality of suspected threat actors.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, predicting and mitigation of cyber threats based on deep AI-driven analytics. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142.

In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
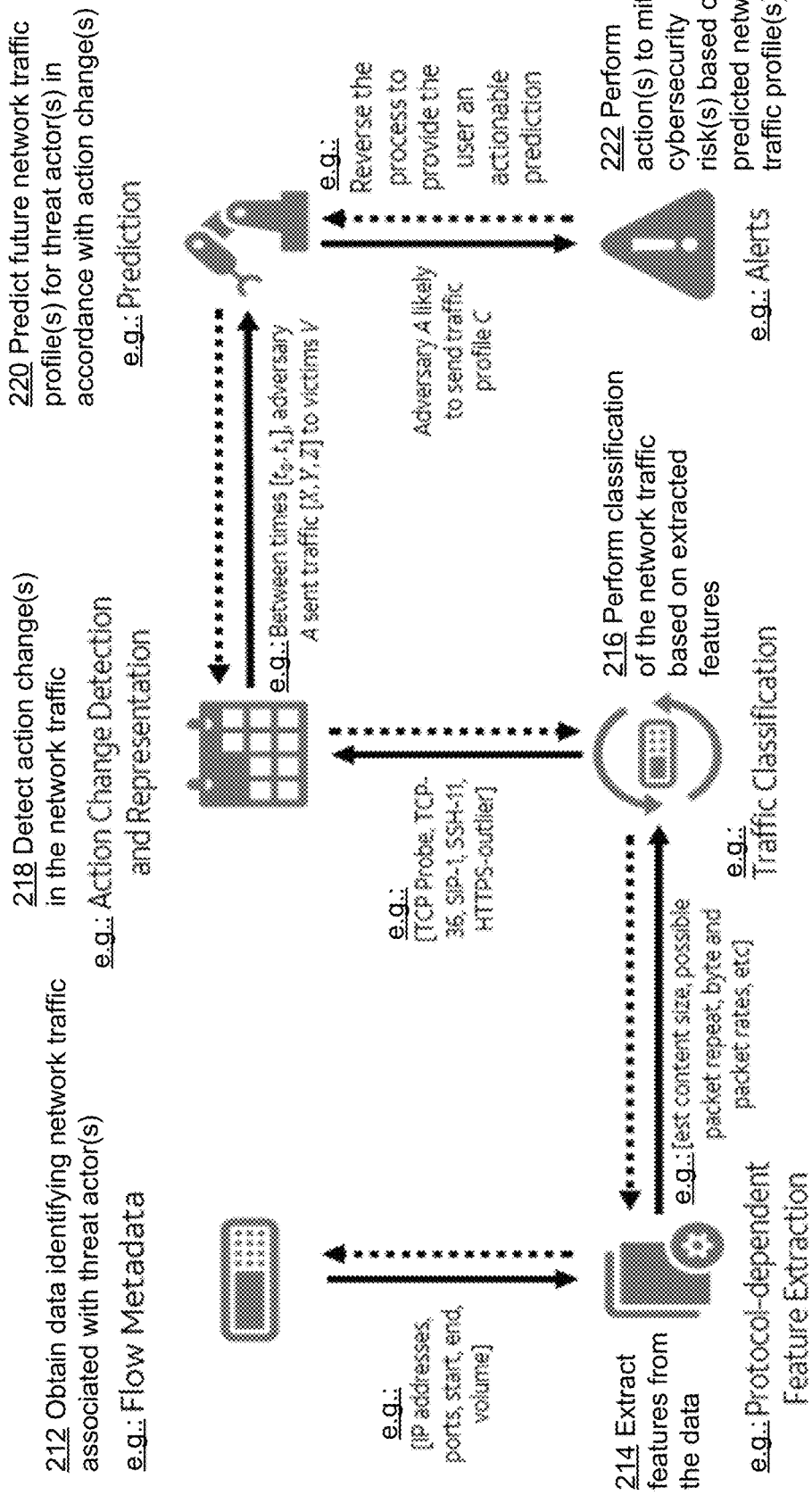
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or operatively overlaid upon, the communications network 100 of FIG. 1 in accordance with various aspects described herein. As shown in FIG. 2A, the system 200 can include a threat prediction platform 210. The threat prediction platform 210 can include one or more devices (e.g., server device(s) or the like) configured to provide one or more functions or capabilities, such as those relating to predicting and mitigation of cyber threats based on deep AI-driven analytics.

Although not shown, the threat prediction platform 210 may be communicatively coupled to one or more user/computing devices, which may include one or more devices capable of receiving, generating, storing, processing, and/or providing data (e.g., network-related data, control data, etc.) relating to the threat prediction platform 210. For example, a user/computing device can include a communication and/or computing device, such as a mobile phone (e.g., a smart phone, a radiotelephone, etc.), a desktop computer, a laptop computer, a tablet computer, a handheld computer, a display device, a gaming device, a wearable communication device (e.g., a smart wristwatch, a pair of smart eyeglasses, XR gear (e.g., a pair of AR, VR, MR glasses, a headset, headphones, and/or the like), etc.), a similar type of device, or a combination of some or all of these devices.

Further, although not shown, in some embodiments, the threat prediction platform 210 may be communicatively coupled to various devices, such as the aforementioned user/computing devices, via a network. The network may include one or more wired and/or wireless networks. For example, the network may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

It will be appreciated and understood that the system 200 can include any number of threat prediction platforms, user/computing devices, and/or networks.

As shown by reference number 212, the threat prediction platform 210 may obtain data identifying network traffic associated with one or more suspected threat actors. In exemplary embodiments, the data may include flow data, such as, for example, NetFlow Internet metadata and/or other data pertaining to network activities associated with the suspected threat actor(s). In various embodiments, the data may include information regarding IP addresses, ports, start times, end times, data volume parameters (e.g., number of bytes exchanged, number of network packets in a given exchange, etc.), other dimensions, and/or the like. In certain embodiments, the data may be included as part of a vast trove of NetFlow data that may be accessible to a network operator.

In various embodiments, the threat prediction platform 210 may obtain a subset of flow metadata based on threat intelligence information. For example, prior threat intelligence may indicate that certain IP addresses are likely associated with a particular threat actor. Continuing the example, the threat prediction platform 210 may apply a filter to a larger set of flow metadata to obtain a subset thereof that corresponds to traffic relating to those IP addresses. As another example, prior threat intelligence may indicate that various IP addresses are likely associated with multiple threat actors. Continuing this example, the threat prediction platform 210 may apply a filter to a larger set of flow metadata to obtain a subset thereof that corresponds to traffic relating to those various IP addresses.

As shown by reference number 214, the threat prediction platform 210 may extract features from the data. In exemplary embodiments, the threat prediction platform 210 may perform feature extraction by analyzing the data and/or storing protocol-dependent information based on the analysis. In various embodiments, the threat prediction platform 210 may analyze data associated with suspected threat actor(s) and/or store such protocol-dependent information over time. In one or more embodiments, the threat prediction platform 210 may categorize network traffic identified in the data based on type (e.g., scanning-related traffic, DNS requests, Internet Control Message Protocol (ICMP) pings, and/or the like) and/or based on other attributes (e.g., content size, packet report information, byte/packet rates, and/or other dimensions).

Figure 2B:
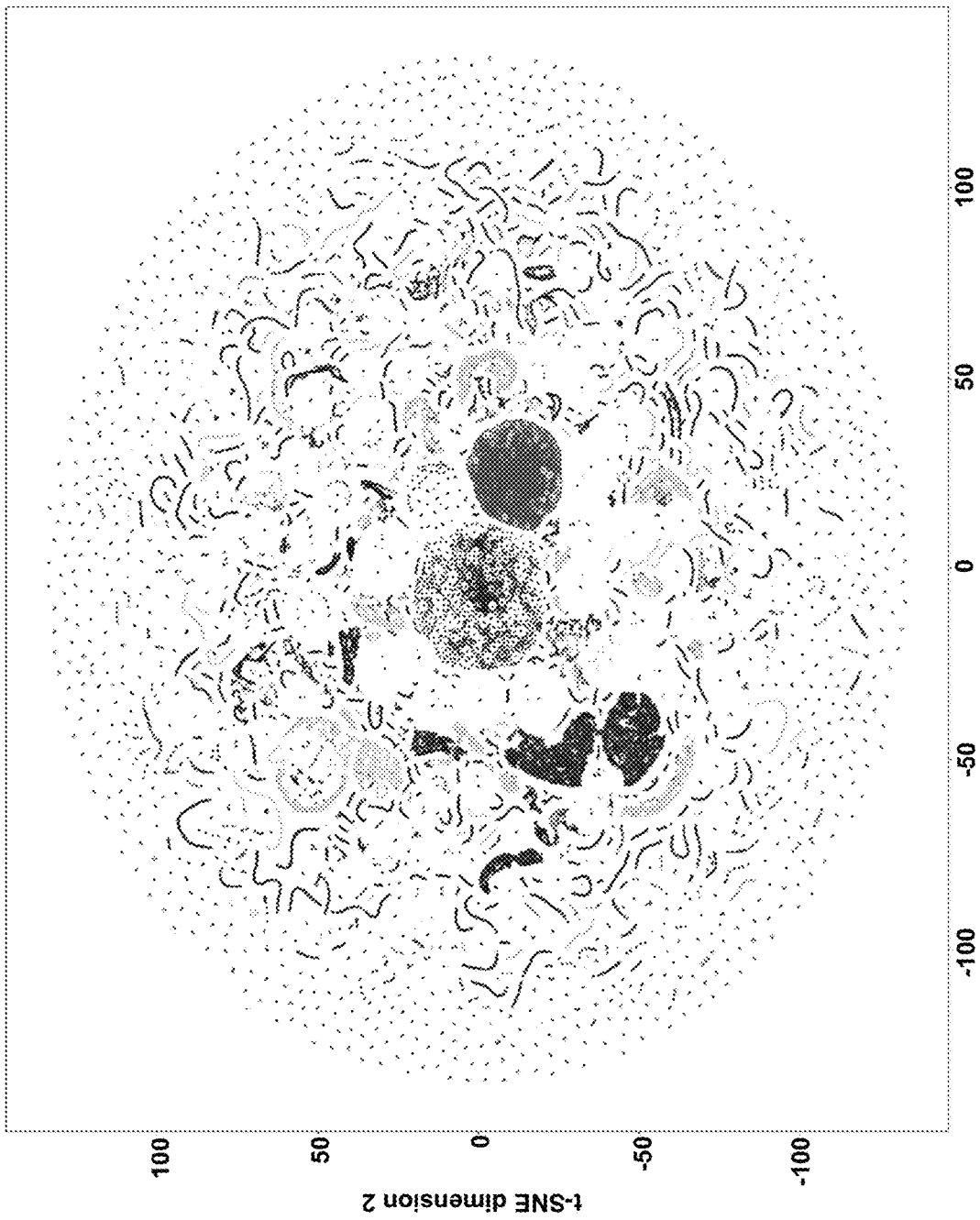
FIG. 2B is an example, non-limiting visualization of density-based clustering of related threat activities in accordance with various aspects described herein.

As shown by reference number 216, the threat prediction platform 210 may perform classification of the network traffic based on the extracted features. In exemplary embodiments, the threat prediction platform 210 may classify network traffic by synthesizing the network traffic as a recognizable traffic type, such as, for example, SolarWinds malware Hypertext Transfer Protocol Secure (HTTPS) traffic, etc. In various embodiments, the threat prediction platform 210 may utilize density-based clustering to label data/traffic types. Here, a predetermined number of clusters may or may not be needed. FIG. 2B is an example, non-limiting visualization of density-based clustering of related threat activities. Clusters of related traffic may be apparent in FIG. 2B, whereas outliers appear as single/sparse dots. In one or more embodiments, the threat prediction platform 210 may apply the same label to dense groups of data points (that are, for example, within a threshold distance from one another), and a different (e.g., "outlier") label for sparse points that are different from one another (e.g., that exceed a threshold distance from one another). In some embodiments, the threat prediction platform 210 may process "outlier" data points to determine further classification, such as a rarity score, a maliciousness score, and/or the like.

As shown by reference number 218 of FIG. 2A, the threat prediction platform 210 may detect, in accordance with the classification, one or more action changes in the network traffic. In exemplary embodiments, the threat prediction platform 210 may be configured to identify/recognize changes in traffic type by monitoring for variations in one or more characteristics of the traffic.

Figure 2C:
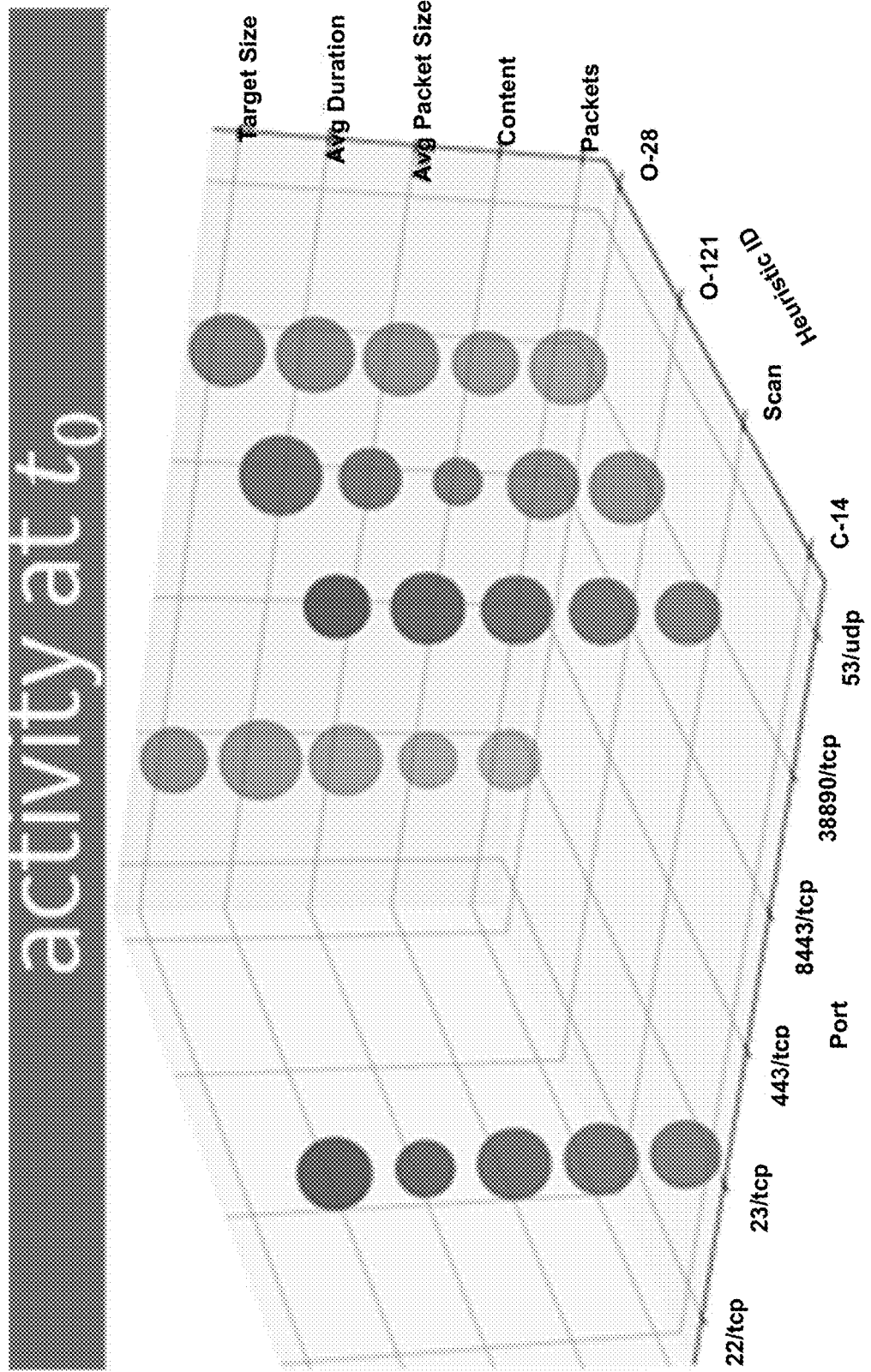
FIGS. 2C and 2D show example matrix representations of activities in network traffic at different points in time in accordance with various aspects described herein.
Figure 2D:
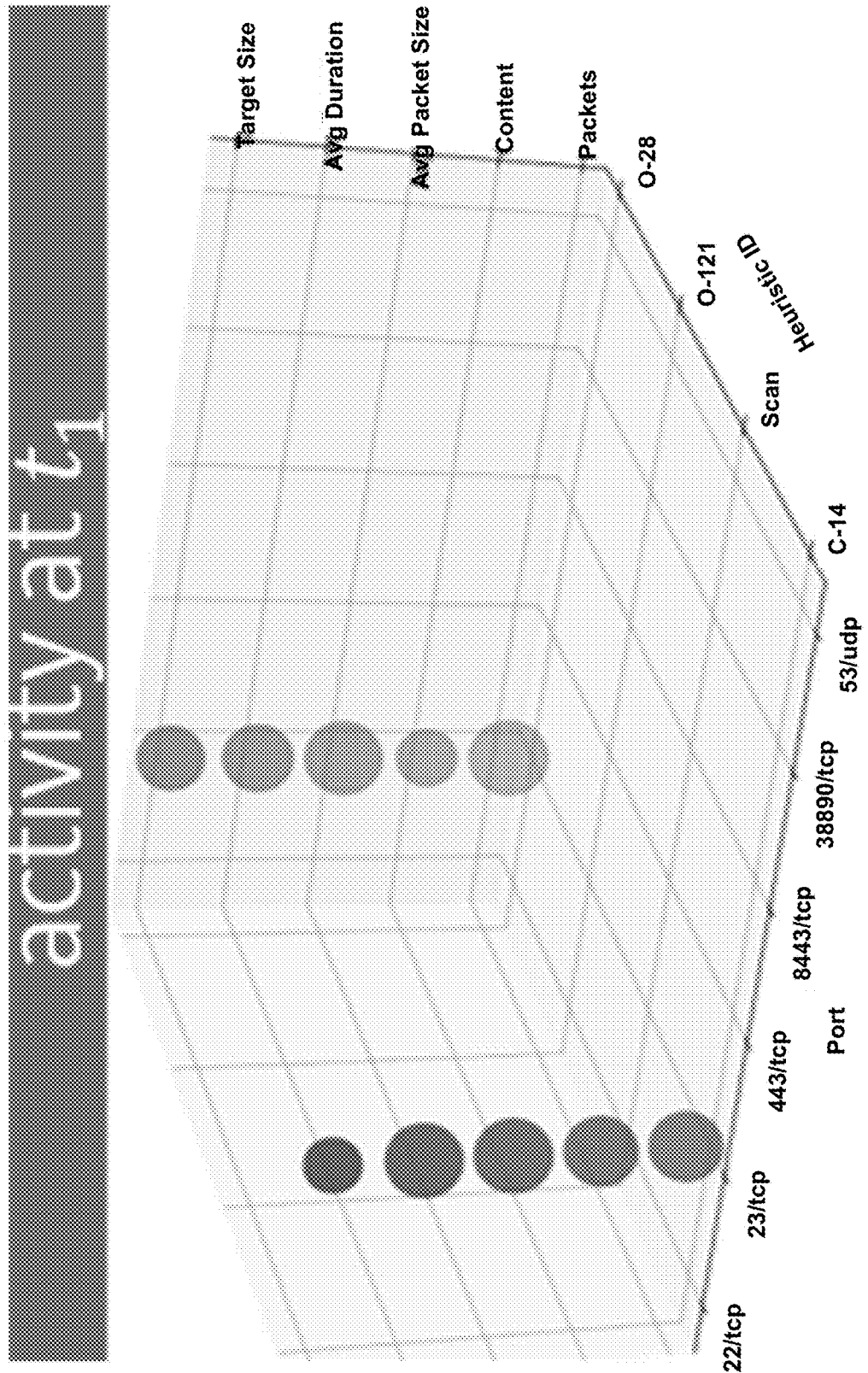
Figure 2E:
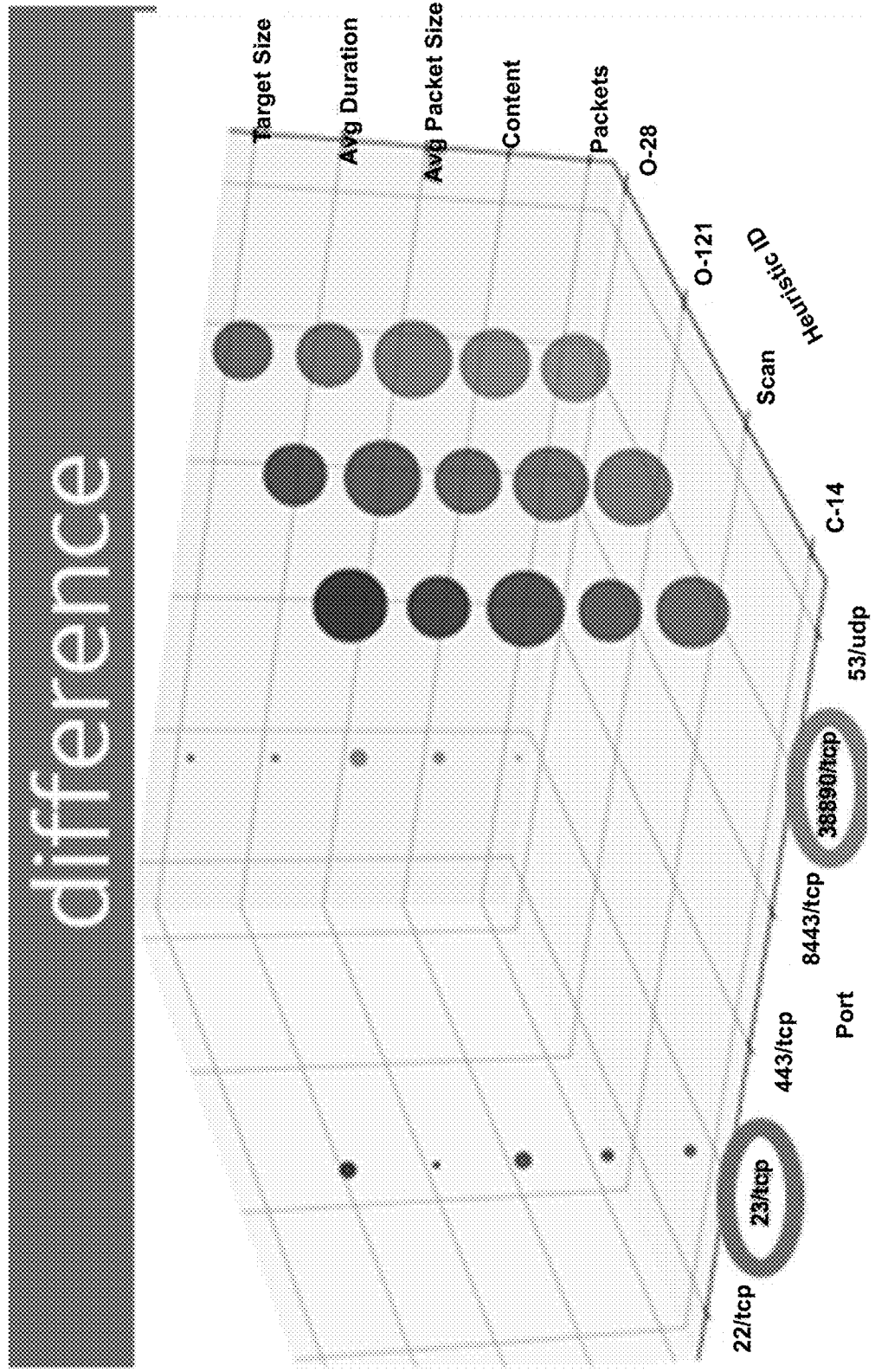
FIG. 2E shows a difference between the matrix representations of FIGS. 2C and 2D in accordance with various aspects described herein.

In various embodiments, the threat prediction platform 210 may generate multi-dimensional (e.g., three-dimensional (3D), etc.) matrix representations of activities in network traffic at different points in time, determine difference(s) between the multi-dimensional matrix representations (e.g., in a case where there are two 3D matrix representations for different times, this may include determining a difference between the two matrices), and apply threshold heuristic(s) on the difference(s). A matrix representation may provide various information, including, for example, data identifying port(s)/protocol(s), traffic type(s)/heuristic(s), metric(s), and/or the like. In certain embodiments, a summed difference of two matrices may be indicative of similarity, where a low similarity (e.g., a summed difference that is less than or equal to one or more thresholds) may suggest a change in activity. Identifying differences between matrices may facilitate comparisons of activities in the network traffic, particularly activities associated with different IP addresses. For instance, a high similarity (e.g., a summed difference that is greater than or equal to one or more thresholds) between activities associated with different IP addresses may indicate that the IP addresses are being utilized or controlled by the same threat actor. FIGS. 2C and 2D show example matrix representations of activities in network traffic at different points in time, and FIG. 2E shows a difference between the matrix representations of FIGS. 2C and 2D. It is to be appreciated and understood that the threat prediction platform 210 may generate any suitable number of matrix representations (e.g., tens, hundreds, thousands, etc. of matrix representations for numerous points in time), and perform difference determinations for some or all of the matrix representations.

In this way, the threat prediction platform 210 may detect changes in campaign(s) of one or more adversaries (e.g., each adversary), and aggregate/summarize the collection of traffic observed in each distinct phase, thereby enabling determination and tracking of sequential steps/phases in attack(s). Delineating the stream of attacks into distinct phases implemented by a (e.g., human) threat actor (who may be operating one or more devices) facilitates detection of patterns and/or cycles in observed sequences and allows for predictions on the phase(s) that are likely to be next.

Figure 2F:
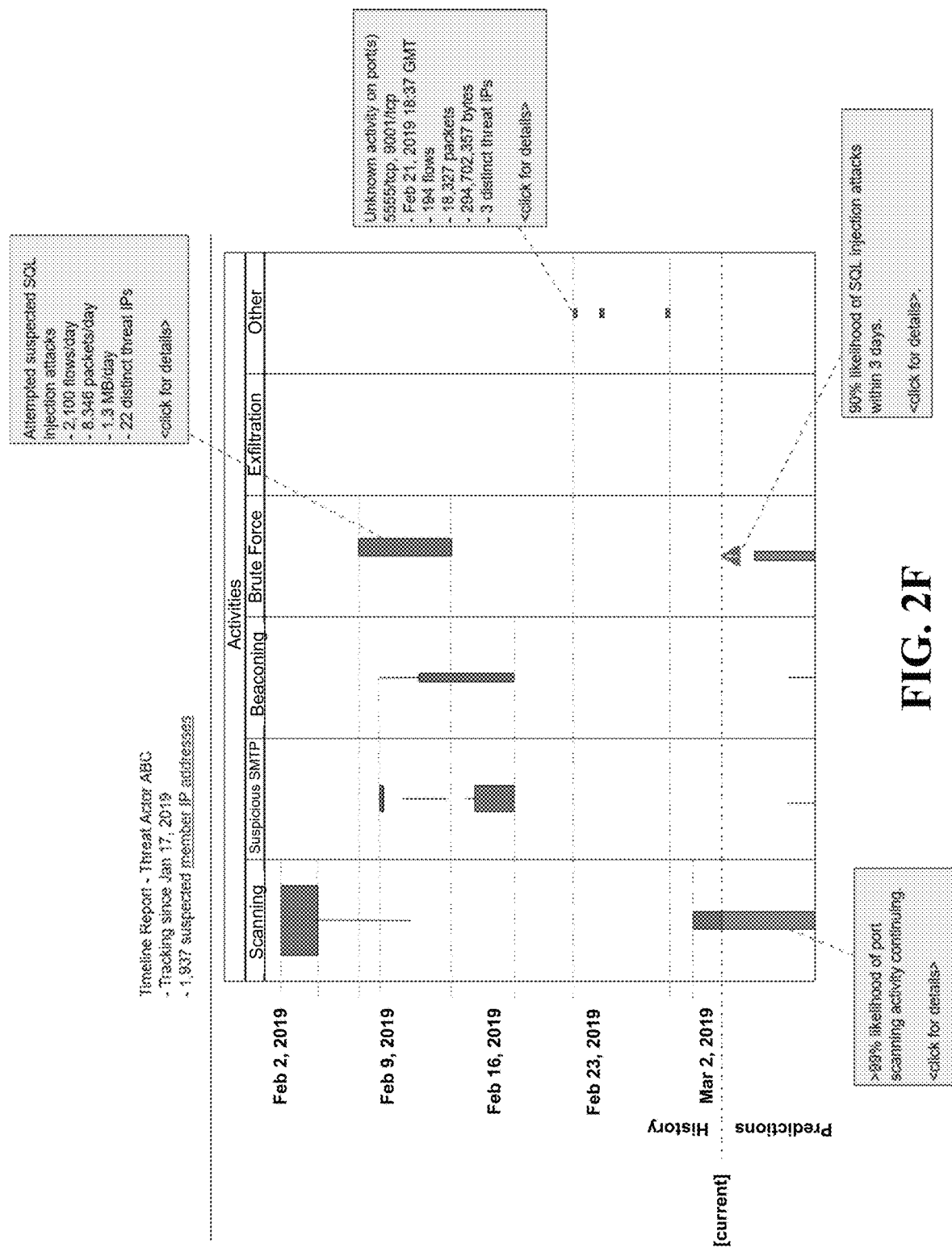
FIG. 2F shows an example interactive report of a threat actor's activities over time and predicted future actions of the threat actor in accordance with various aspects described herein.

As shown by reference number 220, the threat prediction platform 210 may predict future network traffic profile(s) for the threat actor(s) in accordance with the action change(s). In exemplary embodiments, the threat prediction platform 210 may, for a given threat actor, analyze attack responses to determine/measure the threat actor's perceived level of success for an attack. The success or failure of each phase may inform the threat actor's decision-making for a subsequent activity—i.e., few attackers will keep trying an exploit that yields no success and will likely revisit those exploits that prove reliable. In various embodiments, the threat prediction platform 210 may employ one or more RL algorithms (or agents/models) to predict a given threat actor's next steps. In one or more embodiments, the threat prediction platform 210 may employ multiple (e.g., an ensemble) of RL algorithms, and utilize outputs of the various RL algorithms to improve the accuracy of prediction(s). In certain embodiments, the threat prediction platform 210 may apply a weight to each RL algorithm and utilize the weights to distill the algorithm's outputs into a single prediction. Armed with a summary of each observed activity and an estimate of the success of that activity (also referred to herein as "reward"), the threat prediction platform 210 can thus employ AI agents to forecast the likely future activities of each adversary independently. In various embodiments, one or more RL algorithms may obtain state phase information as well as reward information to learn how to predict a threat actor's next steps. FIG. 2F shows an example interactive report of a threat actor's activities over time and predicted future actions of the threat actor.

It is to be appreciated and understood that the threat prediction platform 210 may employ any suitable type of AI algorithms to predict future activities of a threat actor. RL, in particular, is an area of machine learning that is concerned with how intelligent agents ought to take actions in an environment in order to maximize the notion of cumulative reward. RL is one of three basic machine learning paradigms, alongside supervised learning and unsupervised learning. RL differs from supervised learning in that the former does not require that labelled input/output pairs be presented, and does not require that sub-optimal actions be explicitly corrected. Rather, the focus of RL is on finding a balance between exploration (of uncharted territory) and exploitation (of current knowledge).

The following identifies example RL algorithms that the threat prediction platform 210 may employ. Other algorithms may additionally, or alternatively, be employed.

In one or more embodiments, the threat prediction platform 210 may employ Tabular Q-Learning, which is a fundamental algorithm in reinforcement learning where a learner determines a quality ("Q") value for each state/action pair. The optimal action may be one that takes the agent to the best next state. In Q-Learning, the value may be learned from the immediate reward returned by the environment for taking a specific action in a specific state, plus the future reward for taking the optimal action in the next state. The future reward may be represented as the maximum value possible in the next state multiplied by a discount factor between 0 and 1. The discount factor may allow for estimation of rewards far into the future (e.g., without having to follow every possible course of action many steps into the future). With each new batch of experiences, the value function may be updated by decaying the current value of the state/action pair in each experience and adding the new immediate reward plus the discounted future reward.

In one or more embodiments, the threat prediction platform 210 may additionally, or alternatively, employ a Deep Q-learning Network (DQN), which is a model-free RL algorithm for learning the value of an action in a particular state. DQN does not require a model of the environment (hence "model-free"), and can handle problems with stochastic transitions and rewards without requiring adaptations. For any finite Markov decision process (FMDP), Q-learning may find an optimal policy in the sense of maximizing the expected value of the total reward over any and all successive steps, starting from the current state. In Deep Q-learning, a neural network may be used to approximate a Q-value function (where "Q" refers to the function that the algorithm computes—i.e., the expected rewards for an action taken in a given state).

In one or more embodiments, the threat prediction platform 210 may additionally, or alternatively, employ Long Short-Term Memory (LSTM), which is a specialized type of Recurrent Neural Network (RNN) that learns from long sequences of events. RNNs on their own can accurately label data based on lists or series of data, although they may not learn that prediction can be influenced by more distant instances. LSTMs, on the other hand, specialize in handling long-term dependencies. In each time step, LSTM cells may make complex decisions about the importance of past events. For example, if a threat actor had just completed a scanning action, the prediction of next step may be more influenced by the results of a scanning action many steps in the past rather than the most recent step.

In one or more embodiments, the threat prediction platform 210 may additionally, or alternatively, employ a Random Forest (RF) Classifier. An RF algorithm consists of a collection of independent decision trees. Each decision tree (e.g., similar to a flow chart) may be trained on a random subset of samples and features, and produce its own prediction. The mode of all the predictions for the independent decision trees may yield a prediction for an entire ensemble of decision trees. As target values, the RF may attempt to learn and predict the "tokenized" actions of a threat actor, similar to an LSTM model. RF is different from LSTM in that RF trees divide input datasets based on a single feature at a time in a hierarchy, whereas the neural network form of LSTM learns how the linear and non-linear combinations of features relate to the target value.

In one or more embodiments, the threat prediction platform 210 may additionally, or alternatively, employ Policy Approximation RL. The aforementioned RL algorithms are generally value estimators—i.e., they predict the action believed to return the highest long-term expected reward, which presupposes that actions are always selected based on a perception of changing value, rather than a deterministic plan or policy. In contrast, Policy Approximation RL permits modeling (e.g., of threat actors) that is driven by previous action than the result or reward enjoyed by that action.

In exemplary embodiments, the threat prediction platform 210 may employ and/or train an ensemble of some or all of the aforementioned (and/or other) algorithms to provide predictions of future threat actor activities. In various embodiments, for example, the threat prediction platform 210 may train an ensemble ML application using unsampled NetFlow metadata, and evaluate a wide set of threat actor activities.

In cases where an ensemble of RL algorithms is employed to predict future threat profile(s), the threat prediction platform 210 may assign weights to (e.g., each of) the RL algorithms using various criteria. For instance, in various embodiments, the threat prediction platform 210 may be configured to evaluate each RL algorithm in isolation for bias. Here, in a case where a particular RL algorithm, for example, tends to produce (e.g., always produces) the same prediction, and may thus be considered heavily biased, the threat prediction platform 210 may associate a lower weight with the particular RL algorithm relative to a weight assigned to another RL algorithm. As another example, the threat prediction platform 210 may, for a given RL algorithm, determine the performance of the RL algorithm at each step of a training prediction process (e.g., to measure how well the RL algorithm performs in an instance-by-instance (or t-by-t) prediction process), and assign a weight to the RL algorithm based on the performance. Continuing the example, the threat prediction platform 210 may assign a higher weight to a first RL algorithm that performs better (e.g., makes more correct predictions) than to a second RL algorithm. In certain embodiments, such as in a case where an RL algorithm may perform differently in different parts of a prediction sequence (e.g., the RL algorithm may perform better at a first step of the prediction process and worse at a second step of the prediction process), the threat prediction platform 210 may adjust the weight assigned to the RL algorithm accordingly (e.g., the threat prediction platform 210 may assign a higher weight to the RL algorithm for the first step of the prediction process than for the second step of the prediction process). In some embodiments, the threat prediction platform 210 may monitor for "agreement" between a set of RL algorithms, in which case the threat prediction platform 210 may select the prediction outputted by the set of RL algorithms as the "final" prediction. Here, the threat prediction platform 210 may or may not override/ignore/discard another RL algorithm's prediction that is not in "agreement" with the set of RL algorithms. For instance, the threat prediction platform 210 may ignore that other RL algorithm's prediction despite that other RL algorithm's assigned weight being higher than each respective weight assigned to the individual RL algorithms in the set (or the aggregate weight of all the RL algorithms in the set).

In exemplary embodiments, an RL algorithm (e.g., each employed RL algorithm) may be configured to output predictions along with a corresponding level of confidence value. For instance, an RL algorithm may provide a level of certainty for a prediction, such as 50% certainty, 90% certainty, etc., which may aid the threat prediction platform 210 in determining a likely future threat profile. Where each of multiple RL algorithms provide a prediction and a corresponding level of confidence, the threat prediction platform 210 may combine/compare the various predictions and levels of confidence (e.g., in any suitable manner) to arrive at a "final" prediction and confidence value.

In some embodiments, an RL algorithm may additionally, or alternatively, provide a level of severity with an outputted prediction—i.e., where a higher level of severity (e.g., higher than a threshold level) may correspond to a higher consequence or a higher level of damage to, or compromise of, system(s)/data. In these embodiments, the threat prediction platform 210 may factor in the level of severity (and, where there are multiple RL algorithms providing predictions with different levels of severity, factor in the various levels of severity) and arrive at a "final" prediction based on the levels of severity. Here, in some embodiments, and in a case where a first RL algorithm has a lower weight than a second RL algorithm, but where the first RL algorithm outputs a prediction associated with a high level of severity (e.g., higher than a threshold level, such as higher than 70% severity, etc.), the threat prediction platform 210 may nevertheless weigh the first RL algorithm's prediction more heavily than the second RL algorithm's prediction. In this way, the threat prediction platform 210 may facilitate mitigation of threat(s) with possibly severe consequence(s) even if such threat(s) are predicted by an RL algorithm initially associated with a lower weight.

As shown by reference number 222, the threat prediction platform 210 may perform one or more actions to facilitate mitigation of cybersecurity risk(s) based on the future network traffic profile(s). In exemplary embodiments, the threat prediction platform 210 may generate one or more (e.g., preemptive) alerts/recommendations that a security analyst can utilize to effect mitigation of one or more predicted threat activities. For instance, the threat prediction platform 210 may generate one or more alerts regarding the predicted threat activities, such as a corresponding alert for each predicted activity (or set of predicted activities) associated with each threat actor modeled. Predicted threat activities may include those that span a set of IP addresses determined to be associated with a threat actor. FIG. 2F is an example representation that identifies threat actor activities over time and predicted next steps of the threat actor.

To ensure that the number of alerts/recommendations is manageable (and can, for example, be easily triaged by security analysts), alert/recommendation generation by the threat prediction platform 210 may be driven by the probability and/or severity of a given predicted activity, such that the highest priority category may be small and contain (e.g., only) those alert(s) where the predicted activity is most severe (e.g., satisfies a threshold severity level) and/or where the probability of that predicted activity occurring imminently (e.g., within a threshold time) is highest (e.g., satisfies a threshold probability value).

In one or more embodiments, alerts/recommendations may include contextual information and/or data regarding possible defenses (e.g., specific, meaningful defense actions, such as blocking of port(s)/path(s), routing of traffic over different paths, instantiation of firewall(s), and so on), such that a security analyst, for example, may easily understand the threat and the history of the threat actor, and rapidly enact the appropriate response or mitigation measures. In this way, scarce skilled cyber analysts can be more effectively utilized.

Although not shown in FIG. 2F, in various embodiments, the threat prediction platform 210 may include, in a given representation/summary, information regarding data that the threat prediction platform 210 may have utilized in its analysis and/or prediction—e.g., examples of flow metadata records reviewed, examples of traffic classifications determined for various traffic identified in the metadata, and/or the like.

In one or more embodiments, the threat prediction platform 210 may additionally, or alternatively, be configured to perform one or more automated, mitigative or preventive actions based on the predicted threat activities. For instance, in a case where the threat prediction platform 210 predicts that a threat actor is likely to direct traffic over a certain portion of the network over a particular time period, the threat prediction platform 210 may automatically instantiate one or more firewalls for at least that particular time period to block such traffic. It is to be appreciated and understood that the threat prediction platform 210 may automatically perform any suitable mitigative action(s) to address potential threats depending on the nature of those threats.

In certain embodiments, the threat prediction platform 210 may (e.g., as part of one or more steps described above, such as steps 218 and/or 220), provide various outputs, including, for example, one or more expressive summaries and/or one or more index/integer representations of activities. For instance, the threat prediction platform 210 may, as part of step 218, provide an expressive summary regarding a given activity (corresponding to a time t) that identifies the activity type and/or other information regarding the activity. As another example, the threat prediction platform 210 may additionally, or alternatively, and as part of step 220, provide an integer representation for a given activity change (e.g., index number '0' to represent a first type of activity change, index number '1' to represent a second type of activity change, and so on). Providing integer representations as outputs may, for example, simplify reporting of predicted threat profiles and providing of records, logs, or other data used to arrive at the predicted threat profiles. Here, the threat prediction platform 210 may manage/provide a table that maps the integer representations with corresponding activities, where a security analyst may easily reference that table to identify the appropriate activities corresponding to the integer outputs.

Embodiments of the threat prediction platform 210 may thus enable anticipation of cybersecurity threats from sophisticated actors and mitigate them (e.g., before the damage occurs) by modeling a threat actor's decision-making through analyzing of activities of the threat actor, identifying patterns and cycles in the threat actor's behavior, assessing the success of each activity of the threat actor, and predicting future threats from the threat actor using the threat actor models and a representation of the threat actor's current activity. The use of ML agents allows for better representation of the variety of human threat actor decision-making processes. In various embodiments, additional inputs may be utilized by the threat prediction platform 210 to represent real-world events and new vulnerabilities, which can enable improved approximation of human decision-making. In one or more embodiments, the threat prediction platform 210 may perform further traffic and/or adversary characterization to improve the specificity of the mitigation recommendation.

In certain embodiments, threat prediction platform 210 may be configured to refine (e.g., over time and/or based on learnings) attack phase descriptions and/or transition events, and expand on a database of known traffic classification types and methods, which can further improve prediction accuracy and enhance the meaning and utility of system outputs to security analysts.

It can be crucial to ascertain the motives, intentions, and/or techniques of an attacker in order to properly anticipate a future attack. Embodiments of the threat prediction platform 210 enable this by observing changes in threat actor activity (e.g., via analysis of the indicators of decision-making and intention left behind by collecting the widest possible view of an attacker's network traffic), and anticipating set(s) of activities that are likely to be next based on the threat actor's past behavior. This significantly improves over prior solutions that only focus on identifying and following a trend and predicting that the trend will continue.

Figure 2G:
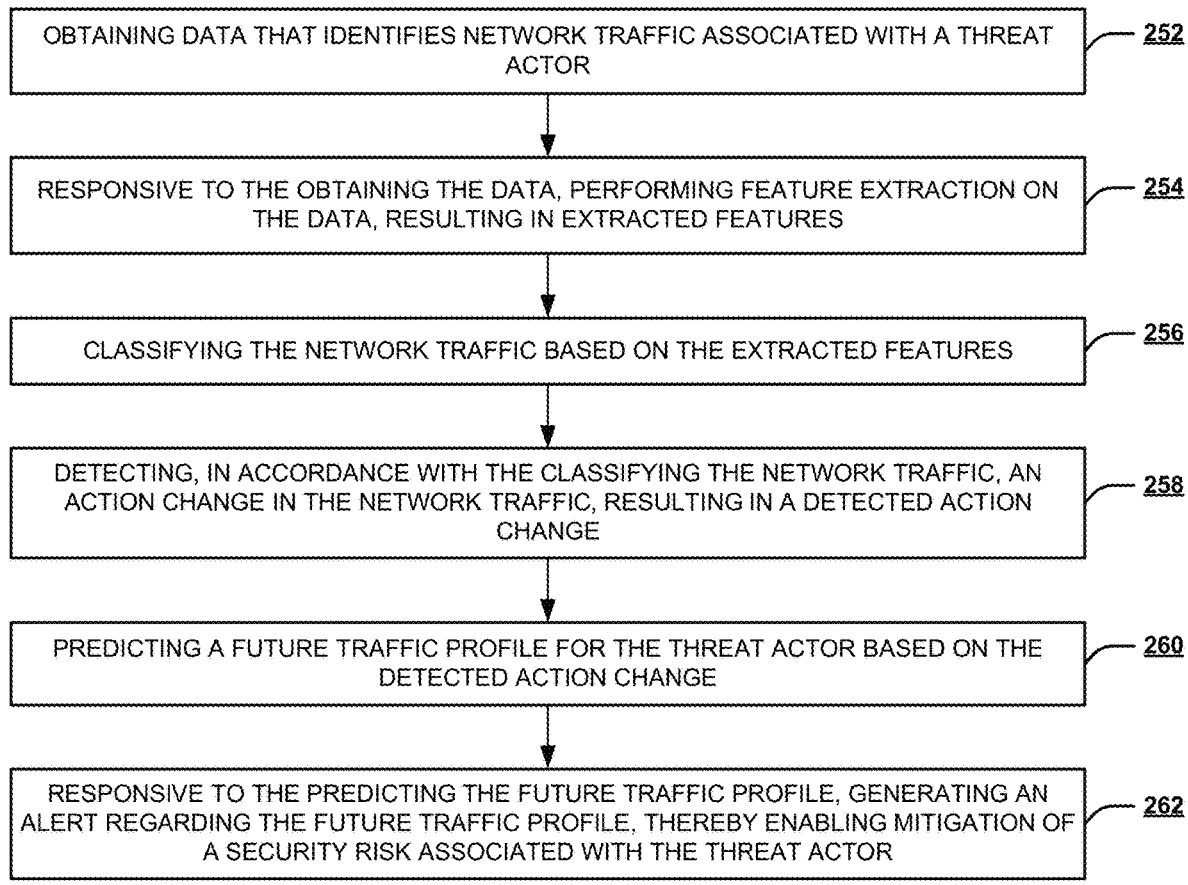
FIG. 2G depicts an illustrative embodiment of a method in accordance with various aspects described herein.

FIG. 2G depicts an illustrative embodiment of a method 250 in accordance with various aspects described herein. In some embodiments, one or more process blocks of FIG. 2G can be performed by a threat prediction platform, such as the threat prediction platform 210. In some embodiments, one or more process blocks of FIG. 2G may be performed by another device or a group of devices separate from or including the threat prediction platform 210, such as user/computing device(s) and/or network(s).

At 252, the method can include obtaining data that identifies network traffic associated with a threat actor. For example, the threat prediction platform 210 can obtain data that identifies network traffic associated with a threat actor, in a manner similar to that described above with respect to the system 200 of FIG. 2A.

At 254, the method can include, responsive to the obtaining the data, performing feature extraction on the data, resulting in extracted features. For example, the threat prediction platform 210 can, responsive to the obtaining the data, perform feature extraction on the data, resulting in extracted features, in a manner similar to that described above with respect to the system 200 of FIG. 2A.

At 256, the method can include classifying the network traffic based on the extracted features. For example, the threat prediction platform 210 can classify the network traffic based on the extracted features, in a manner similar to that described above with respect to the system 200 of FIG. 2A.

At 258, the method can include detecting, in accordance with the classifying the network traffic, an action change in the network traffic, resulting in a detected action change. For example, the threat prediction platform 210 can detect, in accordance with the classifying the network traffic, an action change in the network traffic, resulting in a detected action change, in a manner similar to that described above with respect to the system 200 of FIG. 2A.

At 260, the method can include predicting a future traffic profile for the threat actor based on the detected action change. For example, the threat prediction platform 210 can predict a future traffic profile for the threat actor based on the detected action change, in a manner similar to that described above with respect to the system 200 of FIG. 2A.

At 262, the method can include, responsive to the predicting the future traffic profile, generating an alert regarding the future traffic profile, thereby enabling mitigation of a security risk associated with the threat actor. For example, the threat prediction platform 210 can, responsive to the predicting the future traffic profile, generate an alert regarding the future traffic profile, thereby enabling mitigation of a security risk associated with the threat actor, in a manner similar to that described above with respect to the system 200 of FIG. 2A.

In some implementations of these embodiments, the data comprises flow data.

In some implementations of these embodiments, the data comprises information regarding IP addresses, ports, traffic start times, traffic end times, traffic volume parameters, or a combination thereof.

In some implementations of these embodiments, the performing the feature extraction comprises categorizing the network traffic based on traffic type, traffic attribute, or a combination thereof.

In some implementations of these embodiments, the feature extraction is protocol-dependent.

In some implementations of these embodiments, the classifying the network traffic comprises leveraging a density-based cluster to label different types of data in the network traffic, different traffic types in the network traffic, or a combination thereof.

In some implementations of these embodiments, the detecting the action change comprises generating multi-dimensional matrix representations of activities in the network traffic for different points in time, and determining differences between at least some of the multi-dimensional matrix representations.

In some implementations of these embodiments, the predicting the future traffic profile comprises utilizing at least one artificial intelligence (AI) algorithm to identify at least one expected next step of the threat actor. In some implementations of these embodiments, the at least one AI algorithm comprises at least one reinforcement learning (RL) algorithm.

In some implementations of these embodiments, the generating the alert comprises generating a recommendation of at least one defensive measure against the future traffic profile.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1, 2A, and 2G. For example, virtualized communications network 300 can facilitate, in whole or in part, predicting and mitigation of cyber threats based on deep AI-driven analytics.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
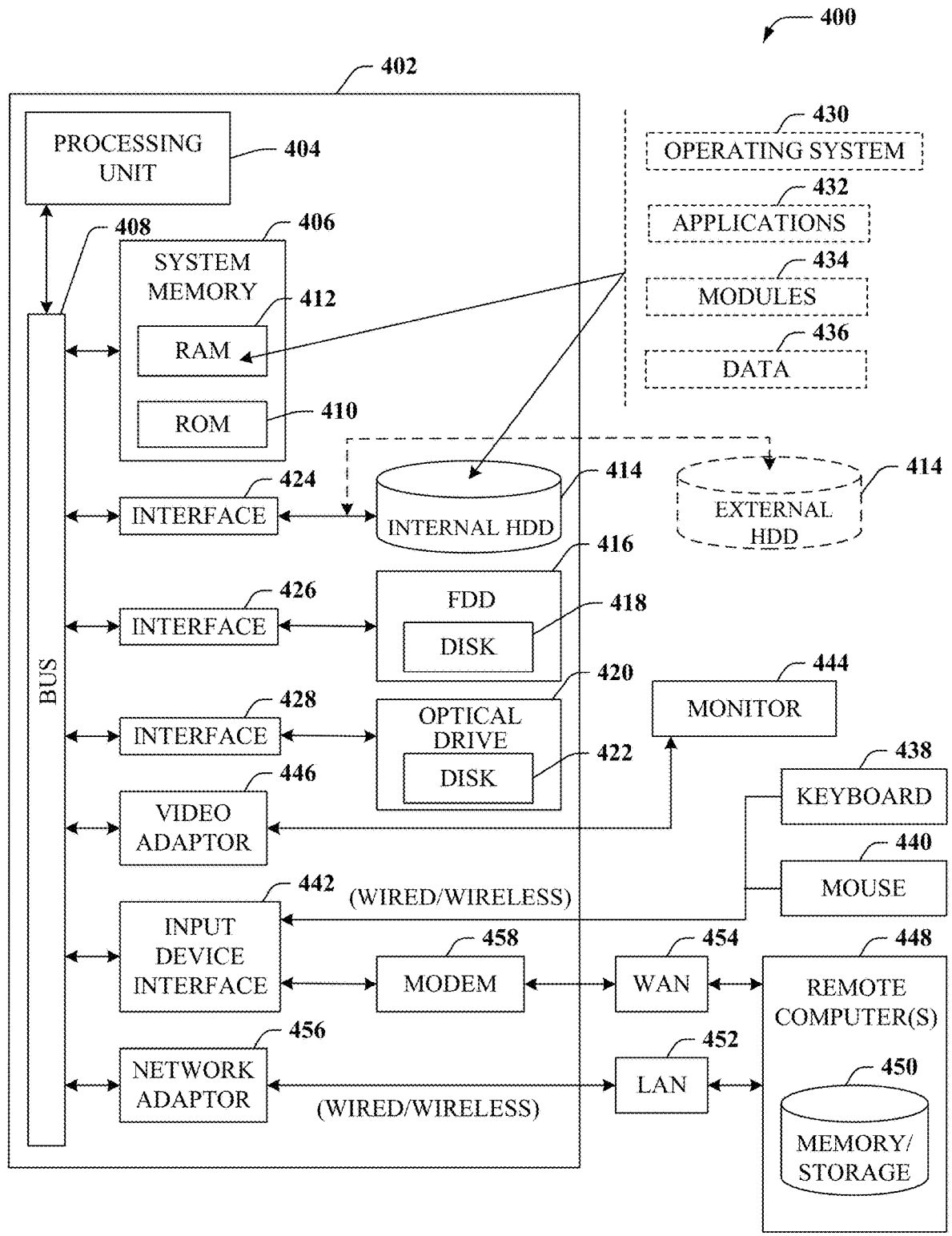
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, predicting and mitigation of cyber threats based on deep AI-driven analytics.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
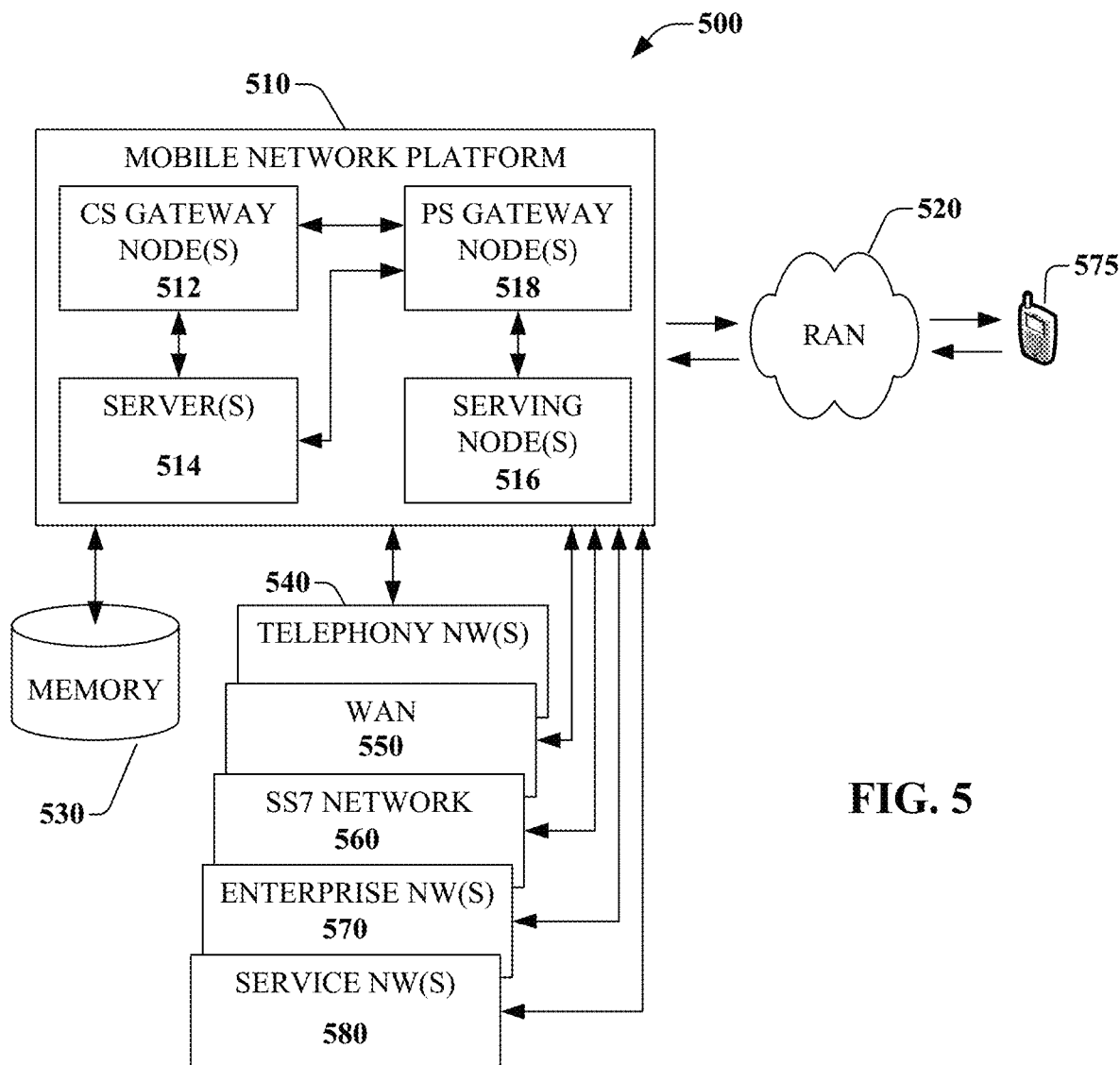
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, predicting and mitigation of cyber threats based on deep AI-driven analytics. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
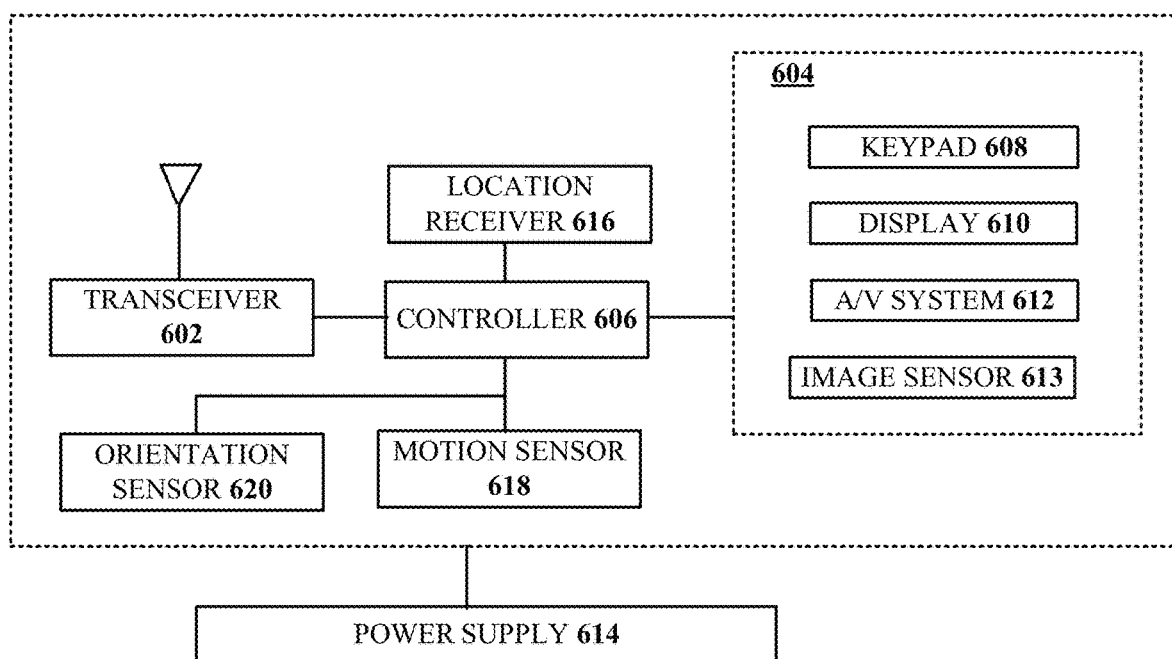
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, predicting and mitigation of cyber threats based on deep AI-driven analytics.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   classifying network traffic based on features extracted from data, wherein the network traffic is associated with a threat actor;
   detecting, in accordance with the classifying the network traffic, an action change in the network traffic, resulting in a detected action change, wherein the detecting the action change involves generating multi-dimensional matrix representations of activities in the network traffic for different points in time;
   predicting a future traffic profile for the threat actor based on the detected action change, wherein the future traffic profile includes an estimate of success of an attack relating to the network traffic based on one or more detected responses to the attack, and wherein the estimate of success corresponds to a perceived level of success by the threat actor and provides an indication of a determined expected subsequent action by the threat actor; and
   responsive to the predicting the future traffic profile, generating an alert regarding the future traffic profile, thereby enabling mitigation of a security risk associated with the threat actor.

2. The device of claim 1, wherein the data comprises flow data.

3. The device of claim 1, wherein the data comprises information regarding IP addresses, ports, traffic start times, traffic end times, traffic volume parameters, or a combination thereof.

4. The device of claim 1, wherein the features relate to traffic type, traffic attribute, or a combination thereof.

5. The device of claim 1, wherein extraction of the features is protocol-dependent.

6. The device of claim 1, wherein the classifying the network traffic comprises leveraging a density-based cluster to label different types of data in the network traffic, different traffic types in the network traffic, or a combination thereof.

7. The device of claim 1, wherein the detecting the action change further involves determining differences between at least some of the multi-dimensional matrix representations.

8. The device of claim 1, wherein the predicting the future traffic profile comprises utilizing at least one artificial intelligence (AI) algorithm.

9. The device of claim 8, wherein the at least one AI algorithm comprises at least one reinforcement learning (RL) algorithm.

10. The device of claim 1, wherein the generating the alert comprises generating a recommendation of at least one defensive measure against the future traffic profile.

11. A non-transitory machine-readable medium, comprising executable instructions that, when executed by a processing system including a processor, facilitate performance of operations, the operations comprising:

analyzing flow data associated with a suspected attacker operating over a network;

performing, using density-based clustering, classification of network traffic identified in the flow data;

identifying an action change in the network traffic based on the classification, wherein the identifying the action change involves generating multi-dimensional matrix representations of activities in the network traffic for different points in time;

determining expected future activities of the suspected attacker using an ensemble of reinforcement learning (RL) algorithms, wherein the determining includes determining an estimate of success of an attack relating to the network traffic based on one or more detected responses to the attack, and wherein the estimate of success corresponds to a perceived level of success by the suspected attacker and provides an indication of a determined expected subsequent action by the suspected attacker; and responsive to the determining, causing a defensive measure to be effected in the network to thwart the expected future activities.

12. The non-transitory machine-readable medium of claim 11, wherein the flow data comprises NetFlow data accessible to a network operator.

13. The non-transitory machine-readable medium of claim 11, wherein each RL algorithm in the ensemble of RL algorithms is associated with a respective weight, resulting in a plurality of respective weights.

14. The non-transitory machine-readable medium of claim 13, wherein the determining the expected future activities is based on the plurality of respective weights.

15. The non-transitory machine-readable medium of claim 11, wherein the defensive measure comprises blocking of a port or path, routing of traffic to an alternative path, instantiation of a firewall, or a combination thereof.

16. A method, comprising:

classifying, by a processing system including a processor, network traffic based on features extracted from data, wherein the network traffic is associated with a plurality of suspected threat actors;

detecting, by the processing system and based on the classifying the network traffic, action changes in the network traffic, resulting in detected action changes, wherein the detecting the action changes involves generating multi-dimensional matrix representations of activities in the network traffic for different points in time;

based on the detected action changes, predicting, by the processing system, a respective future traffic profile for each suspected threat actor of the plurality of suspected threat actors, resulting in multiple future traffic profiles, wherein the respective future traffic profile for each suspected threat actor includes an estimate of success of an attack by that suspected threat actor based on one or more detected responses to the attack, and wherein the estimate of success corresponds to a perceived level of success by that suspected threat actor and provides an indication of a determined expected subsequent action by that suspected threat actor;

generating, by the processing system, recommendations that include suggested defensive actions to preempt activities corresponding to the multiple future traffic profiles; and outputting, by the processing system, the recommendations to enable mitigation of security risks associated with the plurality of suspected threat actors.

17. The method of claim 16, wherein the data comprises unsampled NetFlow metadata records.

18. The method of claim 16, wherein the predicting is performed via reinforcement learning (RL).

19. The method of claim 18, wherein the RL is effected via a Deep Q-learning Network (DQN), Long Short-Term Memory (LSTM), a random forest (RF) algorithm, Policy Approximation RL, or a combination thereof.

20. The method of claim 16, wherein the recommendations are outputted by way of an interactive report.

* * * * *